July 28, 1959 S. E. STULTZ 2,896,287
SEPARABLE AND REVERSIBLE SNAP FASTENER
Filed Nov. 20, 1956

INVENTOR.
SAMUEL E. STULTZ,
BY
ATTORNEY

United States Patent Office 2,896,287
Patented July 28, 1959

2,896,287

SEPARABLE AND REVERSIBLE SNAP FASTENER

Samuel E. Stultz, Miami, Fla.

Application November 20, 1956, Serial No. 623,451

3 Claims. (Cl. 24—211)

This invention relates to improvements in fastener devices and has particular reference to a quick acting and powerful fastener for use in detachably holding chairs and seats, such for instance as a means for securely retaining airplane seats in position against shifting, airplane and other cargo tie-downs and many other uses where a quick acting and readily releasable fastener is desired.

The invention contemplates a generally improved fastener device of quick acting and positive construction embodying a housing of stamped laminations that houses a pair of integral and expandable clamping jaws that are actuable through an opening formed in certain of the laminations to receive and securely grip a headed stud inserted through the openings to engage the stud against accidental withdrawal through substantially an arc of 360 degrees, the device further embodying means to quickly and easily disengage the jaws from the stud for withdrawal when desired.

An important object of the invention resides in the extremely simple and compact construction of the device that adapts it for use as floor fasteners for the legs of aircraft seats or cargo tie-downs, wall brackets or the like, has few and simple parts of a nature requiring a minimum of attention, is strong, durable, cheap to manufacture and is highly efficient in use.

A further and important object of the invention resides in a fastener device having the above noted characteristics, but that is so constructed that it is reversible to commodate studs of different constructions.

Other important objects and advantages of the invention will be readily apparent during the course of the following description, reference being had to the accompanying drawings, wherein has been illustrated a preferred form of the device and wherein like characters of reference are employed to denote like parts throughout.

Figure 1:
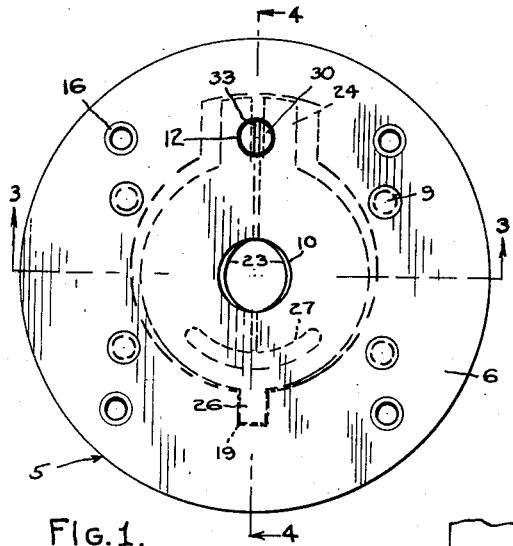
Figure 1 is a plan view of a snap fastener constructed in accordance with the invention.
Figure 2:
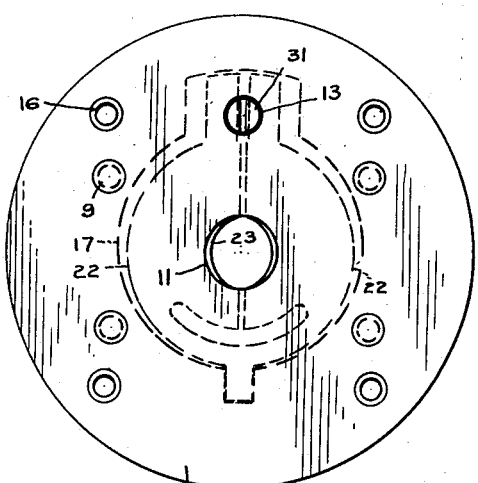
Figure 2 is a plan view of the opposite side of the device.
Figure 3:
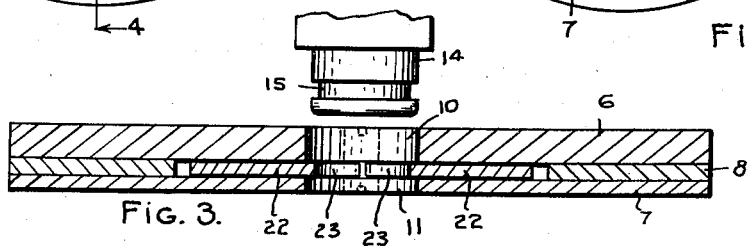
Figure 3 is a transverse section taken substantially on line 3—3 of Figure 1.
Figure 4:
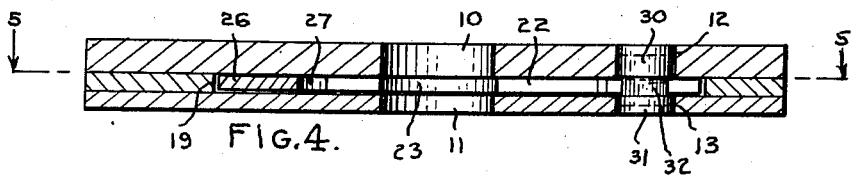
Figure 4 is a transverse section taken at right angles to Figure 3 and along the line 4—4.

Referring specifically to the drawings, the numeral 5 denotes the fastener device as a whole. The fastener is adapted to be secured to the floor of an aircraft either upon or recessed as may be desired, may be secured to various parts of the aircraft as tie-down fasteners for cargo or may be readily secured to walls or other places where a quick acting and readily releasable fastener is desired. The fastener embodies a housing of laminated form, comprising upper and lower flat metallic plates of identical diameters, indicated by the numerals 6 and 7 and in intermediate plate 8 of identical diameter to the plates 6 and 7. The several plates at assembly are preferably riveted together, by rivets 9, as shown. The plate 6 is relatively thicker than the plate 7, for a purpose to be presently described.

The plates 6 and 7 are stamped to provide relatively large and centrally disposed cylindrical openings 10 and 11 that are axially and concentrically arranged and smaller cylindrical openings 12 and 13, also concentric and disposed outwardly from the openings 10 and 11. The openings 10 and 11 are adapted to be transversed by a stud 14, grooved at 15 for the reception of a pair of clamping jaws, to be described. The stud 14 is normally fixedly attached to the lower ends of the legs of chairs, seats or the like or upon the ends of a cable or oher fastening device employed in cargo tie-downs. The stud 14 has a diameter slightly smaller than the diameter of the openings 10 and 11. Each of the plates 6, 7 and 8 are stamped at identical points to provide a plurality of cylindrical and concentric openings 16 for the passage of screws, bolts, rivets or other fastening devices, through the medium of which the housing is securely mounted in position against displacement.

The plate 8 is stamped to form a cylindrical chamber 17, the location of which is slightly eccentric to the axial center line of the plate. The chamber 17 is extended as at 18 to form a generally rectangular offset for the shifting movement of a pair of clamping jaws to be described. Diametrically opposite to the offset opening 18 is a rectangular notch 19 serving as an anchor notch for the clamping device, to be described.

Disposed within the chamber 17 and concentric to the openings 10 and 11, is a clamp indicated as a whole by the numeral 20. The clamp 20 is stamped from a single section of flat metal and with the clamp consisting of a cylindrical body of somewhat smaller diameter than the diameter of the opening 17. The body is split transversely for its major diameter, as at 21 to form a pair of clamping jaws 22. The clamp is further stamped centrally and axially thereof to form arcuate notches 23 that communicate with the split 21, that partially overlies the openings 10 and 11 when the device is in the clamping position and with the arc of the notches being substantially identical with the arc of the openings 10 and 11. The jaws 22 terminate at one side of the plate in a pair of parallel arms 24 that are spaced apart by a relatively wide slot 25, that communicates with the slot 21. At a diametrically opposite point, the plate terminates in a flat tongue 26 that has seating engagement within the notch 19. The split 21 terminates in an arcuate opening 27 whereby to form spring legs 28 and through the medium of which the clamp may be spread apart to cause the notches 23 to lie in concentric and aligned relation to the openings 10 and 11.

Figure 5:
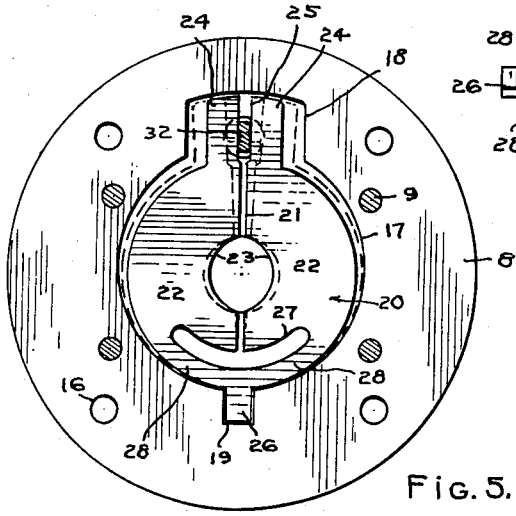
Figure 5 is a horizontal section taken on line 5—5 of Figure 4.
Figure 6:
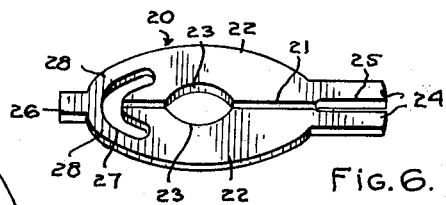
Figure 6 is a perspective view of a clamping device embodied in the invention and, Figure 7 is a perspective view of a control stud for actuating clamping jaws to a release position.
Figure 7:
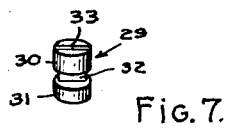

The means to spread the jaws apart comprises a cylindrical stud 29, having upper and lower cylindrical portions 30 and 31, that are connected by a flat key 32. The key 32 is proportioned to engage between the arms 24, within the slot 25. The upper cylindrical portion 30 of the stud corresponds in height to the thickness of the plate 6 while the lower cylindrical portion 31 corresponds in height to the plate 7 and with the upper and lower ends of the stud being flush with the upper and lower surfaces of the device. The upper and lower faces of the stud are slotted at 33 for the reception of a tool, such as a screwdriver and whereby the stud may be rotated. It will be apparent, that the stud when rotated through an arc of 90 degrees, will spread the legs 24 and the jaws 22 outwardly, as indicated in dotted lines in Figure 5 and, when the stud is reversed to its normal operating position, the jaws will be permitted to fully engage the edges of the notches 23 within the groove 15 of the stud 14 and to impart a major clamping action throughout the major circumference of the groove 15. The slots 33 of the stud are parallel with the key 32 so that the operator may readily determine the position of the clamping jaws. The tongue 26 and the arms 24 maintain the clamping device substantially centrally arranged with respect to the openings 10 and 11 and, since the plate is anchored by the tongue 26 against shifting laterally in the chamber created by the eccentric opening 17 and with the legs 24 having a relatively close sliding engagement within the arcuate end of the opening 18, the clamping device will be adequately supported against movement away from the openings 10 and 11. The key 32 has been inwardly cut at its opposite ends in order to provide an area of the cylindrical portions 30 and 31 that will always overlie and underlie the legs 24 to prevent disengagement of the stud.

In assembling the device, the stud 29 is engaged with the slot 25 between the legs 24. The clamp 20 is then engaged with the plate 8, by first engaging the tongue 26 into the notch 19. The plate 8 is then disposed over the plate 7, with the cylindrical portion 31 of the stud engaging the opening 13 and it will be apparent, that the lower side of the chamber formed by the cutout 17 and the cutout 18 will be fully closed at its bottom. The plate 6 is then disposed upon the top of the plate 8 with its opening 12 engaging the cylindrical portion 30 of the stud, thus closing the upper side of the clamping chamber. The rivets 9 are then inserted and riveted in the usual manner, completely assembling the unit with the clamping device 20 securely anchored in concentric relation to the openings 10 and 11. It will of course be understood, that the thickness of the clamp 20 is such as to permit of the spreading of the jaws 22 against the tension of the spring legs 28. The assembled device having been mounted at the point of use, such for instance as the floor of an aircraft or other point of use, it is securely bolted down by bolts or like fastening devices passing through the aligned openings 16. When it is desired to anchor for instance, an aircraft seat, carrying the studs 14, the studs are inserted downwardly through either the opening 10 or the opening 11, forcing the jaws 22 outwardly until the groove 15 has moved into alignment with the clamp, in which position, the clamping jaws 22 spring inwardly to cause their arcuate notches 23 to engage the groove 15. The stud 14 will now be securely held against axial movement with respect to the fastener. As before pointed out, the device is reversible for studs of different construction and the stud 14 of a modified form may be inserted through the opening 11 when the device is in the inverted position, in each instance, forcing the jaws outwardly against the tension of the legs 28 and in the clamped position, the legs 24 move inwardly with the jaws to a point where they lie upon opposite sides of the key 32. When the seat or other device is to be released, the operator rotates the stud 29 through the medium of a screwdriver turning the key 32 at a right angle, forcing the legs 24 and the jaws 22 outwardly against the tension of the legs 28 to a point where the notches 23 are concentric with the openings 10 and 11 and the clamp may be held in such a release position by the key 32 until such time as the stud 29 is again rotated back to its original position. The position of the slots 33 will at all times indicate to the operator whether the jaws are in the clamping or release positions. Due to the integral construction of the clamp 20, no extra springs are required to move the jaws to the fully clamping position. The clamp 20 is of course heat-treated and hardened to provide an adequate clamping engagement with the stud 14 against accidental movement outwardly of the device under all normal conditions.

It will be apparent from the foregoing that a very simple and highly efficient fastener device has been provided for the reception of grooved studs and readily adapts itself to many uses, such as cargo hold-down means and may be used in many positions upon aircraft and also adapts itself as a fastener for cargo carried by trucks and the like where a cable is provided with a suitable stud for engagement with the openings 10 and 11. The parts are all readily stamped from suitable sheet metal and assembled with a minimum of effort. The jaws 22 are supported in a manner to avoid pivotal pins, springs or the like and is self-aligning at all times with respect to the openings 10 and 11. The assembly of the device requires no mechanical means other than the rivets 9 and it will be noted that the rivets are disposed relatively close to the chamber 17 whereby to impart the major strength against the possibility of fracturing the jaws 22. The device is strong, durable, economically manufactured and is highly effective as a hold-down snap fastener for the purposes hereinbefore noted.

It is to be understood, that the invention is not limited to the precise structural details illustrated, but that changes are contemplated as readily fall within the spirit of the invention as shall be determined by the scope of the subjoined claims.

Having described my invention, what I claim as new and desire to secure by Letters Patent is:

1. A reversible type fastening device of the character described for clamping engagement with a stud having a grooved head, the device embodying a housing that consists of upper and lower and an intermediate flat laminations riveted together, the upper and lower laminations being provided with concentric and centrally arranged cylindrical stud receiving openings and concentric openings formed in the upper and lower laminations that are laterally spaced from the first named openings, a rotatable release stud disposed within the last named openings and with the opposite ends of the last named stud being in flush arrangement with the outer faces of the upper and lower laminations, the intermediate lamination being cut away to form an opening that constitutes a relatively shallow flat cylindrical chamber for the reception of stud clamping mechanism, the chamber at one side being extended to provide an anchoring notch for a clamping mechanism, the said clamping mechanism being formed integrally to form a flat cylindrical body portion that is transversely slotted for its major diameter, the body portion also being provided centrally thereof with a pair of opposed arcuate notches that communicate with the slot and whereby to jointly form an eliptical opening, the said notches being upon the same radius as the first named cylindrical stud receiving openings of the upper and lower laminations, the said body portion being also provided with a concentric arcuate slot that extends an equal distance to either side of the first named slot and with the slots communicating, the first named slot providing a pair of substantially identical clamping jaws, the second named slot forming a pair of oppositely extending flat arcuate spring arms, a flat anchoring tongue that projects radially from the clamping device intermediate the said spring arms for anchoring engagement in the said notch of the chamber, the said jaws each being extended to form a pair of spaced apart and parallel release arms that engage the said rotatable stud, the stud intermediate its length having a flat key that engages between the arms and whereby the arms and the jaws are spread apart under the influence of the turning movement of the key and against the tension of the spring arms.

2. The structure according to claim 1, wherein the said chamber is eccentric with respect to the axial center of the first named stud receiving opening of the housing and of a diameter greater than the diameter of the body portion of the clamp and whereby to form a clearance for the shifting movement of the jaws outwardly under the influence of the rotatable stud and its key, the said jaws when spread apart disposing their notches in concentric alignment with the first named openings of the housing.

3. A reversible type fastening device of the character described for clamping engagement with a stud having a grooved head, the device embodying a housing that consists of upper and lower and an intermediate flat laminations that are riveted together, the upper and lower laminations being provided with centrally arranged and concentric openings for receiving the stud to be clamped, the upper and lower laminations also being provided with concentric and relatively smaller cylindrical openings that are laterally spaced from the first named openings, a release stud that is rotatably supported within the last named openings and with the release stud having flat end portions that are disposed in flush relation to the outer surfaces of the upper and lower laminations, the intermediate lamination being provided with a relatively large central opening and whereby to form a relatively shallow flat cylindrical chamber, a stud clamping mechanism disposed within the chamber, the chamber at one side being extended to provide a notch for an anchoring tongue formed upon the clamping mechanism, the said clamping mechanism being formed from a flat metallic sheet to form a cylindrical flat body portion having the anchoring tongue, the said clamping mechanism being relatively smaller in diameter than the diameter of the chamber, the said body portion of the clamping mechanism being transversely slotted for its major length to provide a pair of opposed and substantially identical clamping jaws, the said jaws intermediate their length being cut away to form arcuate opposed notches that partially bisect the first named openings of the upper and lower laminations, the said jaws being extended to form a pair of parallel and spaced apart release arms and with the release arms bisecting the second named openings of the upper and lower laminations, the said release stud having upper and lower cylindrical extremities that are rotatable in the second named openings of the upper and lower laminations, the said rotatable stud being provided intermediate its length with a flat key that engages between the release arms of the clamping mechanism and whereby to shift the clamping jaws apart when the key is rotated to a predetermined degree, the upper and lower extremities of the release stud being slotted for the reception of a tool, the said clamping device being additionally slotted to form arcuate spring arms that bias the jaws to a clamping position, the said clamping device being anchored against shifting movement by the said tongue and by the engagement of the extended arms with the key of the release stud and whereby to accurately center the clamping device and its arcuate notches with respect to the housing and with respect to the first named openings of the upper and lower laminations and with edges of the notches of said jaws being disposed in the line of movement of the first named grooved stud, the second named slotting of the clamping member to form the spring arms being extended an equal distance in an arcuate plane from the first named slot of the clamping mechanism and with the several slots communicating and whereby the spring arms exert an equal clamping force upon each of the jaw members and whereby the arcuate notches of the jaws are biased into equal clamping engagement within the groove of the first named stud.

References Cited in the file of this patent

UNITED STATES PATENTS

| | | |
|---|---|---|
| 625,567 | Kingston | May 23, 1899 |
| 863,543 | Lomax | Aug. 13, 1907 |
| 1,264,242 | Winans | Apr. 30, 1918 |
| 1,853,025 | Anderson | Apr. 12, 1932 |
| 2,363,436 | Pancoe | Nov. 21, 1944 |
| 2,380,568 | Adams | July 31, 1945 |
| 2,420,060 | Adams | May 6, 1947 |
| 2,492,113 | Rees | Dec. 20, 1949 |
| 2,688,173 | Van Peet | Sept. 7, 1954 |